United States Patent Office 3,267,435
Patented August 16, 1966

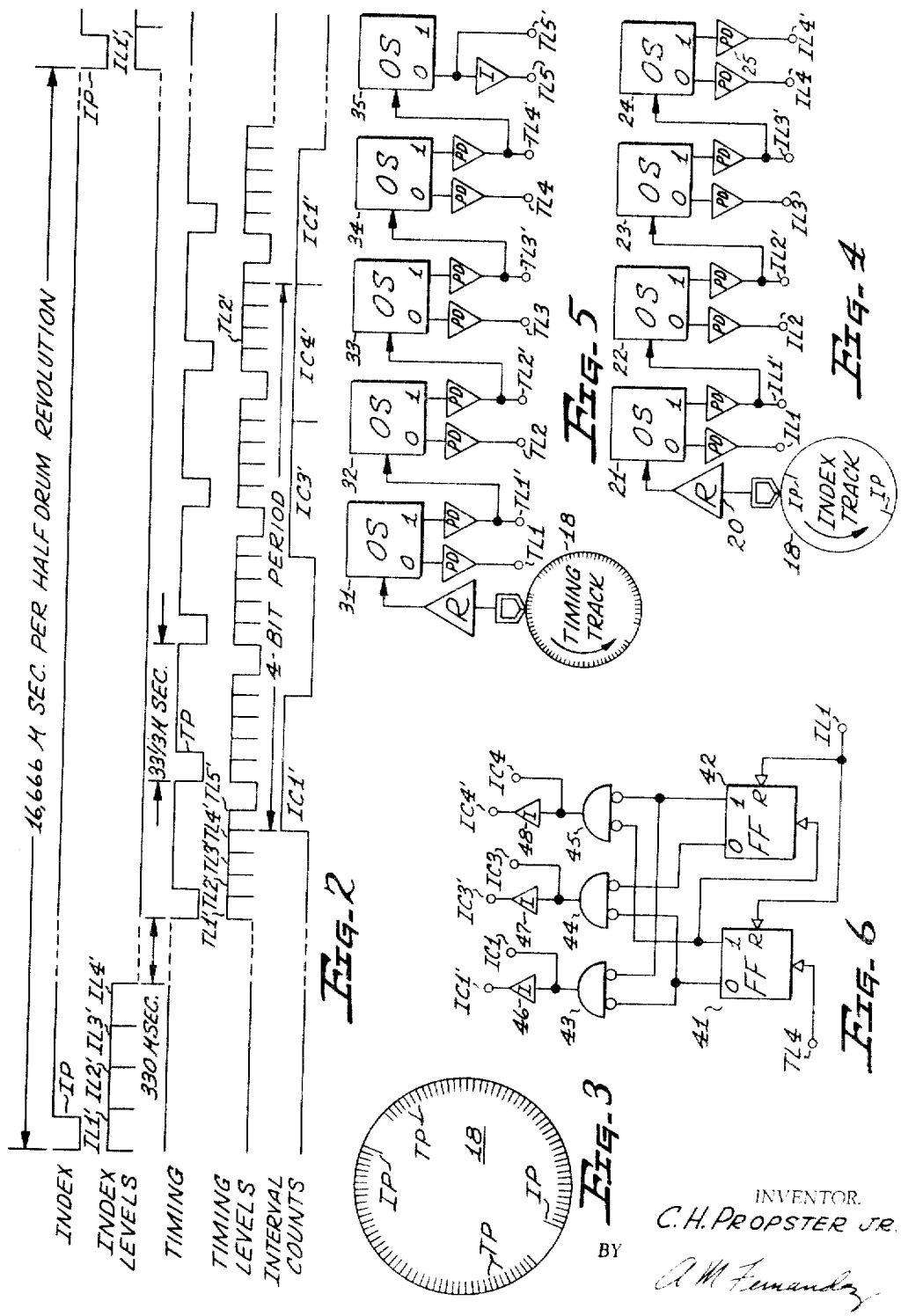

3,267,435
MULTIPLE SHIFT REGISTERS
Charles H. Propster, Jr., San Jose, Calif., assignor to General Electric Company, a corporation of New York
Original application Oct. 27, 1959, Ser. No. 849,002. Divided and this application June 25, 1962, Ser. No. 204,697
3 Claims. (Cl. 340—172.5)

This invention pertains to a system for providing a plurality of shift registers on a track of a magnetic drum or disc.

The development of high-speed inspection methods in manufacturing processes has created a need for a system for accumulating and coordinating inspection data. For those manufacturing processes which require a large amount of inspection data to be accumulated, it is desirable to implement requisite components in an economical manner. For instance, in a system for accumulating and coordinating inspection data from sensors disposed along an inspection line, a delay proportional to the distance the sensors are displaced from a given reference point at the end of the line may be provided in the transmission channels between the sensors and the accumulating system in order that information obtained during successive intervals of time from different sensors on a given item as it travels along the inspection line may be correlated and accumulated. Shift registers may be advantageously adapted to provide the requisite delays in the various channels of a data accumulating system because the translation of data from the sensors to the accumulating system may be readily synchronized with the operation of the inspection line and the accumulating system.

It is an object of this invention to provide a plurality of shift registers in an economical manner using a single magnetic track on a rotating magnetic medium and a single control section on a time-sharing basis through the use of a marker track on the rotating magnetic medium.

In one embodiment of the invention, inspection data from a plurality of sensors is accumulated and printed on a permanent record sheet through a plurality of synchronizing channels, one channel for each different portion of inspection data to be recorded. Certain channels include a delay shift register between its associated sensor and accumulator to compensate for the distance the sensor is displaced from a reference point along the inspection line. A single rotating magnetic drum provides all of the binary storage required to implement the novel shift registers. Only a small amount of additional binary storage is necessary for the control section of the shift registers. That additional binary storage is relatively small since only one control section is provided for all of the shift registers implemented on one track of the rotating drum. This economic use of control circuits is accomplished through a time-sharing technique made feasible by organizing the drum in halves or pairs of sectors such that two complete operating cycles are provided for each shift register during each drum revolution. Data recorded in a given sector is read out in series and immediately re-recorded in corresponding cells of an associated sector on the other side of the drum. One-half of a drum cycle later, the data is re-read and transferred back to the given sector. Thus, the data is continually transferred between the sectors. Each time the data is transferred, it may undergo some operation; therefore, a system implemented in such a manner may perform as many as two operations during one drum cycle.

A source of synchronizing pulses is provided on the drum to time each drum operation within a given half-cycle and another source of pulses controlled by some external means, such as the inspection line, is provided to synchronize the rate at which operations occur with the rate at which the external control means is being operated. In the present embodiment, the second source of synchronizing pulses is a modified tachometer driven by the inspection line to generate one pulse for each linear foot of motion. The inspection line comprises tinplate passing over sensors as it is coiled so that the synchronizing pulses from the tachometer are generated at the rate that linear elements of tinplate are inspected. The second source of synchronizing pulses in the illustrated embodiment is referred to hereinafter as a TACH pulse source.

Other objects and inventions will become apparent from the following disclosure taken in conjunction with the accompanying drawings in which:

FIG. 2 is a timing diagram of synchronizing pulses;

Figure 1:
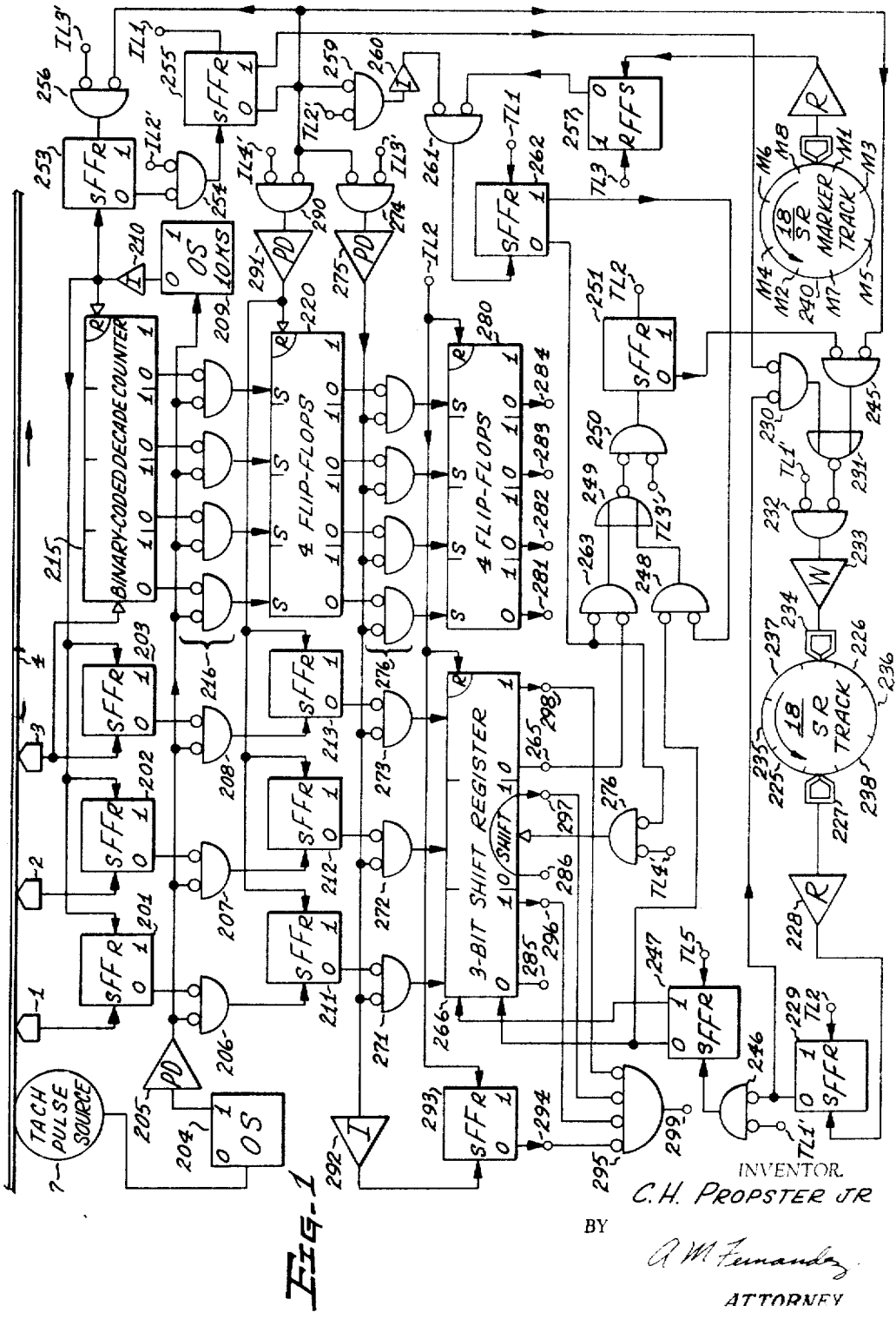
FIG. 1 is a schematic diagram of the delay section in a data-accumulating system having a plurality of shift registers implemented on a track of a rotating magnetic medium.

FIG. 3 ilustrates schematically the physical location of recorder timing pulses in each sector with respect to recorded index pulses which define the sectors; and FIGS. 4, 5 and 6 illustrate schematically the manner in which the synchronizing pulses of FIG. 2 may be obtained.

For a more complete description of the data-accumulating system of which the present invention is a component part, reference is made to the co-pending application Ser. No. 849,002, filed Oct. 27, 1959, now Patent No. 3,093,-730, from which the present application has been divided.

GENERAL DESCRIPTION

Referring to FIG. 1, three transducers or detectors 1, 2 and 3 are shown for sensing defects in a tinplate 4 as it is inspected and wound into a coil by means not shown. The sensors are displaced from each other such that each inspects a different foot at a given time. Each defect, such as pinhole, produces in a corresponding detector a pulse signal which is fed to a data input control circuit.

To co-ordinate all of the inspection data with respect to a given foot, the inspection data from each detector is so delayed in a delay section that all of the data pertaining to that given foot is fed to an accumulating section at the same time. The delay section consists of the data input control section and a plurality of shift-register channels. Each shift-register channel receives its corresponding data and transfers it through a plurality of binary storage cells, one cell at a time, in response to TACH pulses from a source 7 until the desired delay has been introduced.

The TACH pulse source 7 may be a tachometer driven by the tinplate and modified to generate a pulse for each linear foot of tinplate that passes over it. Accordingly, the transfer of data through a shift-register channel is synchronized by TACH pulses at the same rate that the tinplate is inspected. For instance, if the detectors 1, 2 and 3 are respectively twenty-five, twenty-three and seventeen feet away from a shearing station not shown, and if the data from the detectors is transferred through corresponding shift-register channels having twenty-five, twenty-three and seventeen cells, respectively, then all of the data transferred out of the shift-register channels at any given time must pertain to the same foot of tinplate.

Under normal operation, the tinplate is inspected at a relatively constant rate so that the TACH pulses are generated at a substantially constant rate. However, when the tinplate coil (not shown) is separated from the line, the tinplate is decelerated, sheared and then accelerated by a control means not shown with the result that the TACH pulse repetition rate is decreased and then returned to normal. Since the delay introduced by each shift-register channel is controlled by TACH pulses, the delay through each channel is in terms of feet of tinplate inspected and the fact that the speed of the tinplate varies is not important.

The accumulating section to which the coordinated data from the delay section is fed consists of an accumulator input control circuit and a plurality of accumulators, one accumulator for each type of data to be accumulated. The transfer of data from the shift-register channels to the accumulators is accomplished through the data input control circuit and the accumulator input control circuit.

While transferring the inspection data from the delay section to the accumulating section, the coordinated data may be processed to develop other useful data which may then be accumulated in addition to the raw data. In the instant embodiment, all of the data pertaining to a given foot is processed by a logic circuit to determine whether any defects have been detected; if not, a signal is developed indicating that the given foot is prime or first in quality. All of the prime-foot signals are then accumulated in the same manner as other data to provide the total number of prime feet in the coil as part of the information record.

It may not be necessary to coordinate all of the data in certain applications. Data which does not need to be coordinated is transferred directly through the data input control circuit and the accumulator input control circuit. In the instant embodiment, the total number of feet inspected and the total number of pinholes detected in the the coils are not coordinated. The total-feed data which is obtained by accumulating TACH pulses does not need to be coordinated since every foot of tinplate is the same for the purpose of obtaining total footage.

The total-pinhole data is obtained by first counting pinhole defect signals in the data input control circuit for each foot of tinplate inspected and then adding the pinhole count for each foot to an accumulated total. If an exact total pinhole count is desired for each coil, the pinhole count data should also be coordinated in the same manner as other inspection data.

When a shear command is received from a source external to the system, a transfer switch is actuated and all of the data in the drum accumulators is transferred to a buffer section which includes a drum buffer and a data print control section. The drum buffer stores the accumulated data pertaining to the coil just sheared from the line until the data print control section calls for it to be printed out one digit at a time at a rate determined by a printer which transfers the accumulated data to a permanent record.

The drum shift register channels, drum accumulators and drum buffer are all implemented on a band of tracks of a magnetic drum so that only one source of synchronizing pulses is required for the proper timing of the operation in each section of the system. The source of synchronizing pulses is also implemented on the band of magnetic tracks in a conventional manner.

TIMING

FIG. 2 is a timing diagram of the synchronizing pulses. The first graph is of the negative-going (+6 to 0 volt) index pulses IP, two of which are oppositely written on a single track of the drum 18 (FIGS. 3 and 4) to separate it into two equal parts. Although in this embodiment the drum 18 is divided into only two equal parts, it should be understood that the drum may be organized into any number of equal parts, by simply providing additional index pulses. For instance, the drum could be separated into three equal parts. Data read from one part would immediately be written in the next part. One third of a drum cycle later, the data would be reread and rewritten in the third part. In that way three operations could be performed in one drum cycle.

The third graph is of the negative-going (+6 to 0 volt) timing pulses TP which are written on another track of the drum 18 (FIGS. 3 and 5). They separate each half of the drum between the index pulses into vary small sectors, each sector constituting a single binary storage cell in a manner well known in the art. It should be noted from the graphs of FIG. 2 and from the diagram of FIG. 3 that a blank space is left between each index pulse IP and the first timing pulse TP following it. In the illustrated example that space is about 370 microseconds. The reason for it is to allow more than sufficient time for data to be transferred between sections of the system in synchronism with an index pulse before operations within the sections commence and to provide at least one blank timing pulse period (33⅓ microseconds). Thus, if desired, that blank space may be reduced to forty microseconds for the time needed to transfer data between sections plus one timing pulse period.

In order to precisely control the transfer of data between sections and to accurately time operations within a given section, several levels of indexing and timing are provided by four index level pulses, each ten microseconds long, and five timing level pulses, each five microseconds long.

The second graph of FIG. 2 is of the index level pulses derived from a circuit shown in FIG. 4 in response to an index pulse from a read amplifier 20. That circuit consists of four monostable multivibrators 21 to 24 cascade coupled through power drivers 25. Each produces a ten microseconds pulse. Since the power-drivers function not only to provide sufficient power to drive a large number of logic circuits in parallel but also to invert the pulses, the IL1' to IL4' pulses shown in the second graph of FIG. 2 are actually derived from terminals coupled to the "true" or 1-output sides of the monostable multivibrators. Similarly, the true signals IL1 to IL4 are derived from terminals coupled to the "false" or 0-output sides of the monostable multivibrators.

In a similar manner the timing pulses TP generate the timing level pulses TL1' to TL5' as illustrated in the fourth graph of FIG. 2 through five cascaded monostable multivibrators 31 to 35 as shown in FIG. 5. As noted hereinbefore, each timing level pulse is five microseconds long.

The reason for designating the positive-going (0 to +6 volts) pulses with a prime, such as IL1' and TL1' pulses, is that a voltage level of +6 volts is used to represent a bit 0 and a voltage level of 0 volt is used to represent a bit 1 in the logic of the system to be described. Accordingly, IL1' is to be read as *not* IL1 while *not* IL1', which should be written as IL1', is to be read as IL1. To avoid confusion, the double negative notation will not be used; instead, its corresponding positive notation is used. However, the inverted or "not" form of a signal obtained from the "false" side of a flip-flop or monostable multivibrator or from the "true" side through an inverter will very frequently be used.

The pulses in the last graph of FIG. 2 are derived from an interval counter schematically illustrated in FIG. 6. It consists of two cascaded binary circuits 41 and 42 which count the end of each TL4 pulse and which are reset by each IL1 pulse. The function of the interval counter is to separate the binary cells of each half of the drum into digit groups. Each digit group includes four timing periods, each period having a duration from the end of one TL4 pulse to the end of the next TL4 pulse. The number of periods in the group has been arbitrarily selected so that each group may store one four-bit binary-coded decimal digit. A signal corresponding to each of the interval count periods, IC1 to IC4, except that the second, IC2, is obtained from a decoder consisting of three logic AND-gates 43, 44 and 45. Inverters 46, 47 and 48 connected to the output terminals of the AND-gates provide the IC1', IC3' and IC4' pulses of FIG. 2.

The sources of these index level, timing level and interval count pulses will not be referred to again. Instead, input terminals which are to be connected to particular ones of the output terminals of the circuits in FIGS. 4, 5 and 6 will be indicated by legends.

In addition to the index level and timing level synchronizing pulses, other control signals are obtained from other tracks on the drum. The manner in which those control signals are derived will be described hereinafter with reference to FIG. 1.

CIRCUIT ELEMENTS

Before proceeding with a detailed description of an embodiment of the invention, circuits which may be used to implement that embodiment will first be generally described. For a detailed description and diagrams of those circuits, reference is made to the aforementioned co-pending application. The basic module or building block from which almost all of the circuits of the invention may be constructed consists of a NOR-circuit comprising a common-emitter transistor amplifier that is useful not only as an inverter and as an active element in transistor monostable multivibrators or one-shots and bistable multivibrators or flip-flops but also to provide the logic AND and OR functions. The logic functions are provided with a NOR-circuit by coupling an input terminal to the base of the transistor by impedance elements so that only when both input signals are negative with respect to the emitter bias will the transistor amplifier conduct. If the emitter is connected to a bias source of +6 volts, a logic level of +6 volts for the output signals is established. That +6 volt level may be arbitrarily defined as a binary 0.

The collector of the transistor is connected to an output terminal which is clamped to ground by a diode so that a second logic level of 0 volt defined as a binary 1 is established. Accordingly, when two input signals A and B are both +6 volts, the signal at the output terminal is 0 volt. A Boolean equation for that logic AND function may be written as $A'B'=C$. Since the output of the NOR-circuit employed as an AND-gate is changed from a bit 0 to a bit 1 only in response to a +6 volt signal at both input terminals, to obtain the logic AND function of any set of signals X and Y, the binary complements $\overline{X}$ and $\overline{Y}$ are used as the input signals.

As noted hereinbefore, the NOR-circuit is also used as an OR-gate and as an inverter. For the logical OR function, both input terminals are normally at +6 volts to hold the transistor cut off; the output terminal is then normally at 0 volt. If either input terminal is driven to 0 volt, the transistor conducts at saturation and the potential of the output terminal is driven to +6 volts. Thus, the output of the OR-gate is changed from a bit 1 to a bit 0 in response to a bit 1 signal in either input terminal. The logic OR operation may be written as $A+B=\overline{C}$. Accordingly, the OR-gate operates on any set of signals X and Y to provide as an output signal a bit 0 if either X or Y is a bit 1. If only one input terminal is used, the logic element functions simply as an inverter.

A flip-flop may be implemented by cross-coupling the output terminals of two NOR-circuits with their input terminals. A one-shot circuit may be similarly implemented by using only a capacitor for the cross-coupling element from the output terminal of one NOR-circuit to the input terminal of the other.

It should be understood that these and other circuits employed, such as power-drivers, write amplifiers and read amplifiers, may be implemented with other conventional circuit configurations as long as it is understood that allowance should be made for the inherent inverting function of each NOR-circuit employed as either an AND-gate or an OR-gate if a logic gate of a circuit configuration not inherently providing inversion is employed.

In the drawings, the AND-gate is represented by a half circle having input terminals coupled to it by small circles which represent the inherent inverting function of the NOR-circuit when employed to provide the logic function $A'B'=C$. The OR-gate is represented by a half circle having input terminals running through it and an output terminal coupled to it by a small circle which represents the inherent inverting function of the NOR-circuit when employed to provide the logic function $A+B=\overline{C}$. The other circuits are represented by block symbols bearing brief or abbreviated legends.

DRUM SHIFT REGISTER DELAY SECTION

As noted hereinbefore, the delay section illustrated in FIG. 1 consists of a data input buffer and control circuit, and a plurality of drum shift register channels. Although only three drum shift registers are illustrated, as many may be added as space will allow on a drum track.

Data input buffer

Defects detected in the tinplate 4 by each of the sensors 1, 2 and 3 during a given interval trigger respective flip-flops 201, 202 and 203. At the end of that interval, a TACH pulse from the source 7 triggers a one-shot 204 which generates a ten microsecond negative-going TACH pulse. A power-driver 205 inverts the TACH pulse and gates the defect data stored in the buffer flip-flops 201 to 203 through AND-gate 206 to 208. The negative-going trailing edge of the TACH pulse then triggers a one-shot 209 which generates a ten microsecond positive-going delayed TACH pulse. An inverter 210 converts the delayed TACH pulse into a negative-going pulse which is then used to reset the buffer flip-flops 201 to 203. Since the TACH and delayed TACH pulses do not overlap in time, the defect data is gated to another bank of buffer flip-flops 211, 212 and 213 before the first bank of buffer flip-flops 201 to 203 is reset.

Upon being reset, the flip-flops 201 to 203 in the first bank are ready to receive and store defect signals during the next TACH pulse interval. For instance, sensor 3 detects all of the pinholes in a given foot of tinplate, but the first pinhole detected sets the flip-flop 203 which remains set until the next delayed TACH pulse, after which it is ready to receive and store another pinhole defect signal again. Any pinhole detected during that ten microsecond reset period will enerate a pinhole-defect signal which, by proper design of the defect sensor 3, is ten microseconds long. Accordingly, unless the pinhole defect signal exactly coincides with the delayed TACH pulse, it will properly set the flip-flop 202 during the next interval to indicate that the next foot has at least one pinhole. The probability of such a coincidence occurring is so rare that failing to record such a defect would not seriously impair the accuracy desired. However, if greater accuracy is desired, the sensor 3 may be so designed as to produce an eleven or twelve microsecond pulse to insure that it is recorded in the next interval.

To accumulate the total number of pinholes detected each pinhole defect in a given foot is counted by a binary-coded decade counter 215 having its input terminal directly connected to the sensor 3. In this embodiment it is assumed that the total pinhole count for any given foot will not exceed ten. If a larger pinhole count per foot is to be expected, a plurality of binary-coded decade counters may be cascaded to provide a greater count of pin-holes per foot.

The four-bit binary coded decimal character at the output terminals of the counter 215 is gated by a TACH pulse through a bank of AND-gates 216 to a group of four individual flip-flops 220 which, like the flip-flops 211 to 213, function as buffers to store the total pinhole count for a given foot while inspection of the next foot proceeds. A delayed TACH pulse resets the counter 215 at the same time that the flip-flops 201 to 203 are reset.

It should be noted that the data is transferred into the buffer flip-flops 211 to 213 and 220 under the control of TACH pulses which are not synchronized with the drum 18. Accordingly, data into and out of the drum shift registers which are implemented on a track of the drum must be synchronized by drum indexing and timing pulses.

Drum shift registers

The first drum shift register memory consists of a recirculating loop having a pair of large sectors 225 and 226 that are oppositely disposed on a track of the drum 18, a read head 227, a read amplifier 228, a buffer flip-flop 229, a control AND-gate 230, an OR-gate 231, a timing AND-gate 232, a write amplifier 233 and a write head 234. Both sectors have the same number of corresponding binary cells. As the drum 18 rotates in the direction indicated, the data in a given cell of one sector, for instance sector 225, is read prior to the occurrence of the TL1 pulse which marks or times that cell. Assuming that a bit 1 was stored in that cell, the buffer flip-flop 229 is set and a +6 volt signal is translated by the normally enabled AND-gate 230 and OR-gate 231 to the timing AND-gate 232 where, in response to a TL1' pulse, it is gated to the write amplifier 233 to cause a bit 1 to be written in the corresponding cell of the other sector 226. The buffer flip-flop 229 is reset by a TL2 pulse and the entire procedure is repeated for each successive cell in the shift register. If a bit 0 is read from a given cell in sector 225, the buffer flip-flop 229 is not set, the write amplifier 233 is not triggered and a bit 0 is written in the corresponding cell of the opposite sector 226.

The other two shift registers are identical to the first except that they include respective second and third pairs of sectors (235, 236 and 237, 238) on the same track. The sectors of each pair have a predetermined number of binary cells corresponding to the number of units of delay that is to be introduced by the associated drum shift register. In the illustrative embodiment, the number of cells in the first, second and third channels are seventeen, twenty-three and twenty-five, respectively, since it was assumed in the general description that the respective sensors 3, 2 and 1 are seventeen, twenty-three and twenty-five feet away from a reference point.

Data stored in the respective drum shift registers is repeatedly transferred between the corresponding pairs of sectors by reading the data successively from one set of sectors at one station and re-writing that data during the same cell period in corresponding cells of the other set of sectors at a station on the opposite side of the drum. The transfer from one set of sectors to the other is accomplished twice during one drum revolution or cycle. This organization of the drum in pairs of sectors is advantageous because each time the data is transferred from one sector to the other, it may be operated upon. Thus, during each drum cycle there may be two operating cycles. In the delay section, an operation consists of a one-bit position shift of all data, the insertion of one new bit and the extraction of one old bit that has been shifted through all of the associated shift register cells.

The shift register sectors are separated by marker pulses recorded in a marker track 240 of the drum 18. Marker pulses M1 and M2 mark the beginning of the first shift-register sectors 225 and 226. Those marker pulses are recorded on the marker track in coincidence with respective TL5 pulses that immediately precede the TL1 pulses that mark the first cells of sectors 225 and 226. A second pair of marker pulses M3 and M4 are similarly recorded to mark the beginning of the second shift register sectors 235 and 236, and the end of the first shift register sectors 225 and 226. A third pair of marker pulses M5 and M6 mark the end of the second shift register sectors 235 and 236 and the beginning of the third shift register sectors 237 and 238. A fourth pair of marker pulses M7 and M8 mark the end of the third shift register sectors.

Data shift control

In order to shift data in each shift register channel during a shift operation, the data in one sector of each channel must be read out at one station and re-written one cell period later in the opposite sector at the other station. This is accomplished by disabling the control AND-gate 230 to stop the recirculation of data between pairs of sectors and enabling a second control AND-gate 245. A given bit 1 stored in the buffer flip-flop 229 is gated by a TL1' pulse through an AND-gate 246 to a delay flip-flop 247 in another channel where it is stored until a following TL5 pulse resets it. The flip-flop 247 transmits the bit 1 through a normally open AND-gate 248 and an OR-gate 249 to an AND-gate 250. A TL3' pulse which precedes the TL5 pulse that resets the delay flip-flop 246 gates the bit 1 to a buffer flip-flop 251. There it is stored until the next TL2 pulse resets it. In the interim, the output signal of the buffer flip-flop 251 is transmitted to the AND-gate 232 through the open shift control AND-gate 245 and the OR-gate 231. There a TL1' pulse gates the bit 1 signal to the write amplifier 233 which is triggered to write a bit 1. Since the sequence of events are such that the TL1' pulse which gates the bit 1 to the write amplifier 233 is the pulse immediately following the TL1' pulse that gated the bit 1 to the delay flip-flop 229, the delayed bit 1 is rewritten in the cell next to the one corresponding to the cell from which it was read.

From the foregoing it may be understood how all of the data may be shifted one cell position in the drum shift register during a half drum cycle. However, it should be noted that the data shifting channel described must be controlled so that data from one shift register is not shifted directly into the next shift register instead of into an output channel. This is accomplished by a control circuit responsive to marker pulses. Before describing the marker pulse control, the manner in which a shift control signal disables the AND-gate 230 and enables the AND-gate 245 will be described.

It should be recalled that data in the drum shift registers is to be transmitted through the AND-gate 230 each half drum cycle until a TACH pulse is generated at the end of a given foot, which means that data is to be transferred from one sector to the other several times between TACH pulses and then advanced or shifted one cell position during half a drum revolution in response to a TACH pulse.

A delayed TACH pulse sets a buffer flip-flop 253, the output of which is gated by an IL2' pulse through an AND-gate 254 to set a shift control flip-flop 255, thereby enabling the control AND-gate 245 and disabling the control AND-gate 230. This stable condition persists until the next IL1 pulse which, of course, occurs virtually half a drum revolution later. Immediately after the flip-flop 255 is set, the shift control output of flip-flop 255 is gated by an IL3' pulse through an AND-gate 256 to reset the delayed TACH buffer flip-flop 253. Before the flip-flop 255 is reset by an IL1 pulse, one shift operation is completed through the AND-gate 245. After it is reset, the recirculation of data betwen corresponding sectors is resumed via the AND-gate 230. However, the transmission of data through the AND-gate 245 is not without interruptions.

In response to each marker pulse read from the shift register marker track 240, a buffer flip-flop 257 is set from about the time of a TL5 pulse until a following TL3 pulse, at which time the flip-flop 257 is reset. If the shift control flip-flop 255 had been set at the beginning of the half drum cycle, a TL2' pulse is transmitted through an AND-gate 259, an inverter 260 and an AND-gate 261 to set a new-data control flip-flop 262, thereby enabling a new-data control AND-gate 263 and disabling the normally enabled shift control AND-gate 248. A new bit is then transmitted through AND-gate 263 and OR-gate 249. A TL3' pulse gates the new bit through the AND-gate 250 to set the buffer flip-flop 251 before the new-data control flip-flop 262 is reset by a TL1 pulse. In that manner, a marker pulse which marks the beginning of a shift register sector, for instance the pulse M1 which marks the beginning of sector 225, gates a new bit into the first cell of the corresponding shift register sector, in this instance sector 226.

A marker pulse which marks the end of one shift register and the beginning of the next, such as the marker pulse M3, prevents a bit read out of the last cell of the corersponding shift register sector, in this instance sector 225, from being shifted into the next shift register sector, the sector 236. Since the marker pulse M3 marks the beginning of a shift register channel, it also gates a new bit into the next shift register channel. A marker pulse which only marks the end of a shift register sector, such as the marker pulse M7, will also switch the control AND-gates 248 and 263. However, a bit transmitted to the flip-flop 251 at that time would be gated to the write amplifier 233 by the next TL1' which marks a spillover cell outside the last shift register sector. That bit of new-data is thus lost or discarded because no other TL1 pulse occurs until after the next index pulse which recycles the shift register control circuit.

The new input data is derived from a serial output terminal 265 of a three-bit shift register 266. After a given new bit is transmitted into a shift register sector in response to a TL3' pulse applied to the AND-gate 250, the new data control signal is gated by a TL4' pulse through an AND-gate 276 to advance the data in the three-bit shift register one position. As the new data is thus advanced in the three-bit shift register, the bit read from the last cell of the preceding shift register channel is shifted from the delay flip-flop 247 into the first stage of the three-bit shift register. For example, during one half drum cycle, three bits of new data in the shift register 266 are transmitted to the drum shift register channels, the first bit into the first cell of the first shift register channel in response to the M1 marker pulse, the second bit into the first cell of the second shift register channel in response to the M3 marker pulse, and the third bit into the first cell of the third shift register channel in response to the M5 marker pulse. The M7 marker pulse then shifts the third bit of new data out of the last stage of the shift register 266. As each new bit of data is shifted out of the three-bit shift register, the bit read from the last cell of each shift register channel is gated to the delay flip-flop 247 by a TL1' pulse and shifted into the three-bit shift register. Thus, when the last new bit is shifted out of the three-bit shift register in response to the M7 pulse in the foregoing example, the delayed bit from the last cell in the third shift register channel is shifted into the first stage of the three-bit shift register.

*Unloading the three-bit shift register*

At the end of a drum shift cycle of operation, the three-bit shift register data is transferred in parallel to the accumulating section by an IL1' pulse and the three-bit shift register is then reset by an IL2 pulse. It remains reset until the next drum shift operation is initiated by a TACH pulse.

*Loading the three-bit shift register*

Data in the buffer flip-flops 211, 212 and 213 is stored in a static condition until an IL3' pulse gates it into the three-bit shift register in parallel through AND-gates 271, 272 and 273. However, an IL3' pulse does not gate the data into the shift register until an AND-gate 274 is enabled by a shift signal from the flip-flop 255 which is set by the coincidence of a delayed TACH pulse and an IL2' pulse. A power-driver 275 is provided at the output of the AND-gate 274 to provide the polarity and power necessary to operate the AND-gates 271, 272 and 273 in addition to a bank of AND-gates 276 which gate a four-bit digit in parallel into a second bank of four buffer flip-flops 280 from a first bank of four buffer flip-flops 220. There the four-bit digit is stored and presented in parallel at terminals 281 to 284 during the next half drum cycle while a drum shift operation is executed after which the flip-flops are unloaded and cleared in the same manner as the shift register 266. The reason for the static storage of a four-bit digit in the flip-flops 280 during a drum shift operation is that the total pinhole count data is not to be delayed.

After data is loaded into the shift register 266 and a four-bit digit is gated into the flip-flops 280 by an IL3' pulse, the buffer flip-flops 211, 212, 213 and 220 are reset by an IL4' pulse which is transmitted through an enabled AND-gate 290 and a power-driver 291.

In summary, the sequence of operations for the delay section is as follows:

(1) The first defect detected by each of the sensors 1, 2 and 3 sets the respective one of the flip-flops 201, 202 and 203. The first and subsequent defects detected by the sensor 3 are accumulated by the decade counter 215.

(2) A TACH pulse transfers the inspection data to buffer flip-flops 211 to 213 and 220.

(3) A delayed TACH pulse resets the flip-flops 201 to 203 and the counter 215 and sets the flip-flop 253.

(4) An IL2' pulse sets the shift control flip-flop 255 which remains set for half a drum cycle.

(5) An IL3' pulse resets the flip-flop 253 and gates the inspection data into the shift register 266 and buffer flip-flops 280.

(6) An IL4' pulse resets the buffer flip-flop 211 to 213 and 220, thereby concluding the preparations necessary for one shifting cycle of the drum shift registers.

(7) The marker pulse M1 or M2, depending on which half of the drum is being read at the time, set flip-flop 257. Assume it is the M1 marker pulse that is read for the following sequence of operations.

(8) A TL2' pulse sets the new-data control flip-flop 262 via AND-gate 259, inverter 260 and AND-gate 261.

(9) A TL3 pulse resets the flip-flop 257 and a TL3' pulse gates new data from terminal 265 of the three-bit shift register into the buffer flip-flops via AND-gate 263, OR-gate 249 and AND-gate 250.

(10) A TL4' pulse shifts the data one position to the right in the three-bit register 266 and inserts new data from the left, thereby entering a bit of extraneous data into the first stage from flip-flop 247.

(11) By the next TL1 pulse, the first cell of the first shift register sector 225 is read and buffer flip-flop 229 is set.

(12) A TL1 pulse resets flip-flop 262 and a TL1' pulse writes the new bit in the first cell of sector 226. The TL1' pulse simultaneously gates the old bit 1 stored in the buffer flip-flop 229 to the delay flip-flop 247.

(13) A TL2 pulse resets flip-flops 229 and 251.

(14) A TL3' pulse gates the old bit stored in the delay flip-flop 247 to flip-flop 251 via AND-gate 248, OR-gate 249 and AND-gate 250.

(15) A TL4' pulse shifts the first old bit stored in the delay flip-flop 247 into the shift register 266.

(16) The next TL1' pulse writes the first old bit in the second cell of sector 226 and gates the second old bit read from sector 225 to the delay flip-flop 247.

(17) Steps 13, 14, 15 and 16 are repeated until all the data in the first drum shift register has been advanced one cell and the bit read from the last cell is stored in the delay flip-flop 247.

(18) When the marker pulse M3 is read, steps 7 to 16 are repeated for the second drum shift register.

(19) When the marker pulse M5 is read, steps 7 to 16 are repeated for the third drum shift register.

(20) Finally, the marker pulse M7 is read and the flip-flop 257 is set.

(21) A TL2' pulse sets the new-data control flip-flop 262 via AND-gate 259, inverter 260 and AND-gate 261.

(22) A TL3' pulse gates a bit into flip-flop 251 from the shift register terminal 265 via AND-gate 263, OR-gate 249 and AND-gate 250. It should be recognized that this bit of data is the extraneous bit shifted into the three-bit shift register at the beginning of the shift operation cycle in response to a TL4' and M1 pulse as described in step 10.

(23) A TL1 pulse resets the flip-flop 262 and a TL1' pulse writes the extraneous bit stored in flip-flop 251 in the next cell of the drum which is a "spill-over" cell outside of the third shift register sector. No further drum operations are then possible, except the resetting of flip-flops 229, 251, 257 and 247, in that order, since no other timing pulses are written on the drum.

(24) The next IL1 pulse resets the flip-flop 255, thereby rendering the delay section immediately capable of performing another complete sequence of operations as just described if TACH pulse is recieved immediately. At the same time, an IL1' pulse gates the data in the shift register as well as the buffer flip-flop 280 to the accumulating section of drum 18.

(25) An IL2 pulse resets the shift register 266 and the flip-flop 280.

Total-Feet data

The total number of feet of tinplate inspected for a given coil is determined by indirectly accumulating TACH pulses. That is accomplished by gating the shift control signal from the flip-flop 255 through the AND-gate 274. The gated signal is then transmitted through the power-driver 275 and an inverter 292 to a buffer flip-flop 293. Since a TACH pulse indirectly sets the shift control flip-flop 255 in a manner described hereinbefore, the signal gated to the flip-flop 293 indicates that a TACH pulse has been generated and that, therefore, a foot of tinplate has been inspected. An IL1' pulse gates the output signal of the flip-flop 293 from an output terminal 294 to the accumulating section of drum 18. An IL2 pulse then resets the flip-flop 293.

Prime-Feet data

A logic AND-gate 295 is provided to determine whether a given foot of tinplate inspected, as defined by a TACH pulse, is prime or free of any defects. One of the input terminals of that AND-gate is connected to the terminal 294 and the other input terminals are connected to the "true" sides of the binary circuits in the three-bit shift register 266 at terminals 296, 297 and 298. The output terminal 299 of the AND-gate 295 is connected to the input control circuit for the prime-feet data accumulator. A prime-foot signal is produced at the output terminal 299 of the AND-gate 295 when the flip-flop 294 is set if each stage of the three-bit shift transfer 266 is reset thereby indicating that no defects were detected in the last foot of tinplate inspected as manifested by a bit 0 in each channel of correlated data upon the occurrence of the next IL1' pulse which gates the correlated data into associated accumulators not shown.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A plurality of shift registers each comprising:
   a pair of sectors oppositely disposed about a track of a rotating magnetic medium each sector having a corresponding number of cells for storing data;
   a marker track storing a plurality of marker pulses arranged in pairs to mark the beginning and end of each sector;
   a means for reading said marker pulses;
   a first means for reading data stored in said cells of a given sector in a given pair;
   a second means for writing data in cells of the other sector of said given pair;
   a first gated channel connecting said first means and said second means to record in the cells of one sector the data read from the corresponding cells in the other sector;
   a second gated channel having a delay means connecting said first means and said second means to cause a bit read from a given cell in one sector to be recorded in a cell of the second sector following the cell which corresponds to said given cell;
   means for selectively enabling one of said first and second gated channels and means for disabling both of said first and second gated channels in response to said marker pulse marking the beginning of a given sector being read;
   and a third gated channel connecting said first means and said second means, said means for disabling both said first and said second gated channels in response to a marker pulse enabling said third channel, said third channel including means for introducing a bit from an external source to be written by said second means and including means for extracting a bit read by said first means.

2. In a system for transferring data from a plurality of sources through a plurality of shift register channels, the combination comprising:
   a rotating magnetic medium having means for generating index, marker and timing signals;
   a track on said medium effectively divided into a plurality of equal parts by said index signals, each part being separated into a plurality of sectors by said marker signals, one sector for each of said shift register channels, each sector being divided into a plurality of cells by said timing signals which define binary-cell periods;
   reading means for rendering data in each of said sectors of a given part of said track sequentially available for transfer to corresponding sectors of another part of said track;
   writing means for recording data in corresponding sectors of another part of said track;
   a first loop for translating data from said reading means to said writing means without delay;
   a second loop for translating data from said reading means to said writing means with one binary-cell period of delay;
   a source of shift-control signals;
   means for synchronizing a given shift control signal with said index signals, whereby said given shift control signal is present for a period from one index signal until the next;
   a first gating means for inhibiting said first loop in response to the presence of said shift control signal and for inhibiting said second loop in response to the absence of said shift-control signal;
   means for receiving data shifted through a given one of said shift register channels;
   means for transmitting data to be shifted through said given shift register channel; and
   a second gating means interconnecting said second loop and said means for receiving data and said writing means and said means for transmitting data, said second gating means switching said second loop from said writing means to said means for receiving data, and for coupling to said writing means said means for transmitting data, in response to a marker signal separating a given sector of said given shift register channel from a preceding sector on said track, and to the timing signal which defines the first binary-cell period in said given sector during the presence of a shift control signal whereby a delayed digital signal is extracted from said given shift register channel and a new digital signal is entered therein.

3. In a system for transferring data from a plurality of sources through a plurality of shift register channels, the combination comprising:
- a rotating magnetic medium having means for generating index, marker and timing signals;
- a track on said medium effectively divided into a plurality of equal parts by said index signals, each part being separated into a plurality of sectors by said marker signals, one sector for each of said shift register channels, each sector being divided into a plurality of cells by said timing signals which define binary-cell periods;
- reading means for rendering data in each of said sectors of a given part of said track sequentially available for transfer to corresponding sectors of another part of said track;
- writing means for recording data in corresponding sectors of another part of said track;
- a first loop for translating data from said reading means to said writing means without delay;
- a second loop for translating data from said reading means to said writing means with one binary-cell period of delay;
- a source of shift-control signals;
- means for synchronizing a given shift control signal with said index signals, whereby said given shift control signal is present for a period from one index signal until the next;
- a first gating means for inhibiting said first loop in response to the presence of said shift control signal and for inhibiting said second loop in response to the absence of said shift control signal;
- a shift register having a plurality of stages, one for each shift register channel, and having serial input and output terminals;
- means for transferring new digital signals into said shift register in parallel;
- a second gating means interconnecting said second loop and the input terminals of said shift register and said writing means and the output terminal of said shift register for switching said second loop from said writing means to the input terminal of said shift register, and for coupling to said writing means the output terminal of said shift register, in response to marker signals separating a given sector of each of said shift register channels from a preceding sector on said track and to the timing signals which defines the first binary-cell periods of said given sectors during the presence of a shift control signal;
- means for shifting digital signals stored in said shift register one stage in response to reading digital signals from and writing digital signals in the first cells of a given set of sectors of said given shift register channels whereby a delayed digital signal is extracted from said given shift register channel and a new digital signal is entered therein; and
- means for synchronizing the shift control signal so that it is present for each shift operation of said shift register channels only while said given set of sectors are being read by said reading means.

References Cited by the Examiner
UNITED STATES PATENTS

| | | | |
|---|---|---|---|
| 2,770,797 | 11/1956 | Hamilton et al. | 340—172.5 |
| 2,947,478 | 8/1960 | Lentz et al. | 340—172.5 |

ROBERT C. BAILEY, *Primary Examiner.*

WALTER W. BURNS, Jr., *Examiner.*

B. D. REIN, G. D. SHAW, *Assistant Examiners.*